M. ROHDE, Jr.
CHEESE PRESS.
APPLICATION FILED JULY 31, 1912.
1,045,190.
Patented Nov. 26, 1912.
2 SHEETS—SHEET 1.
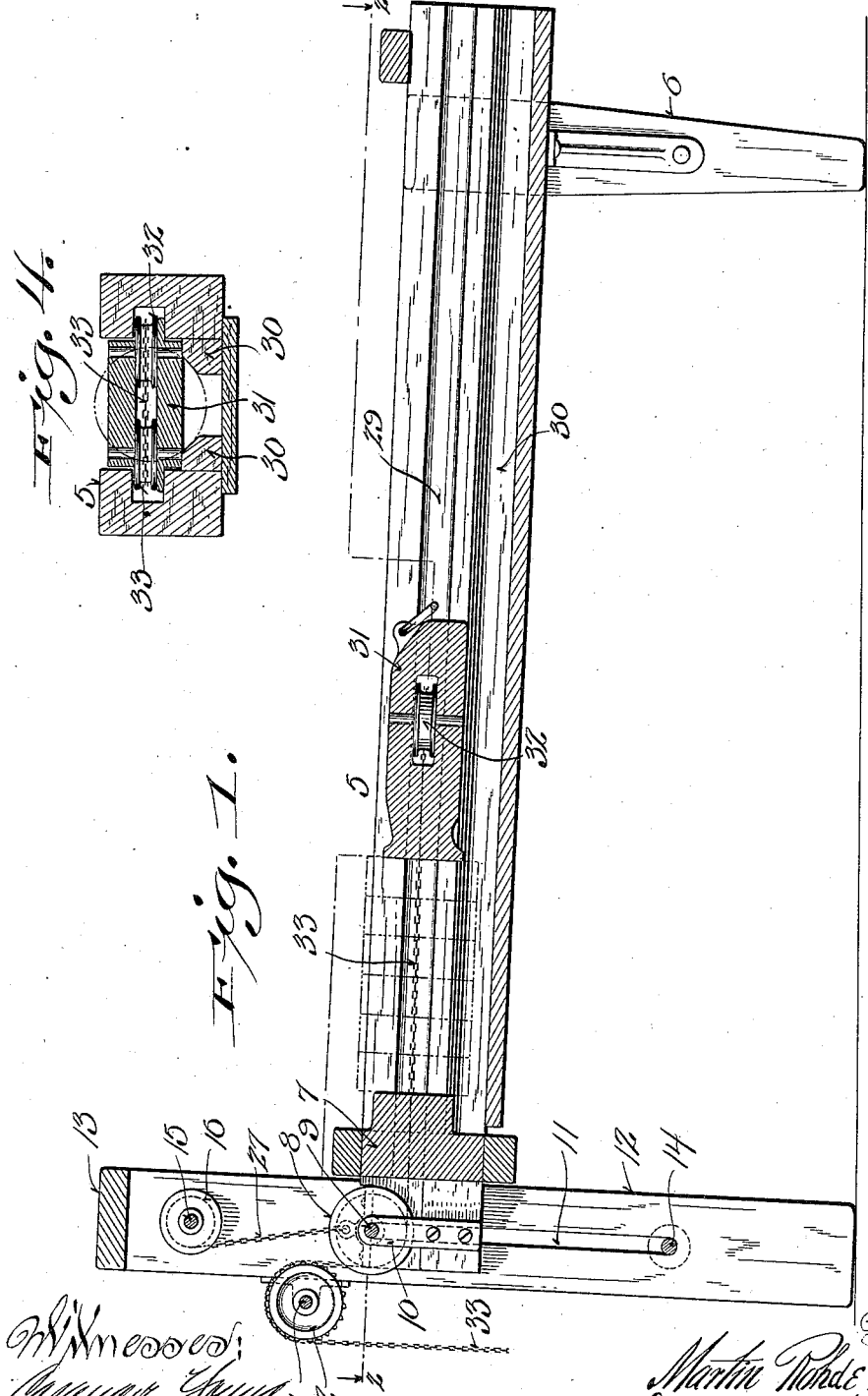

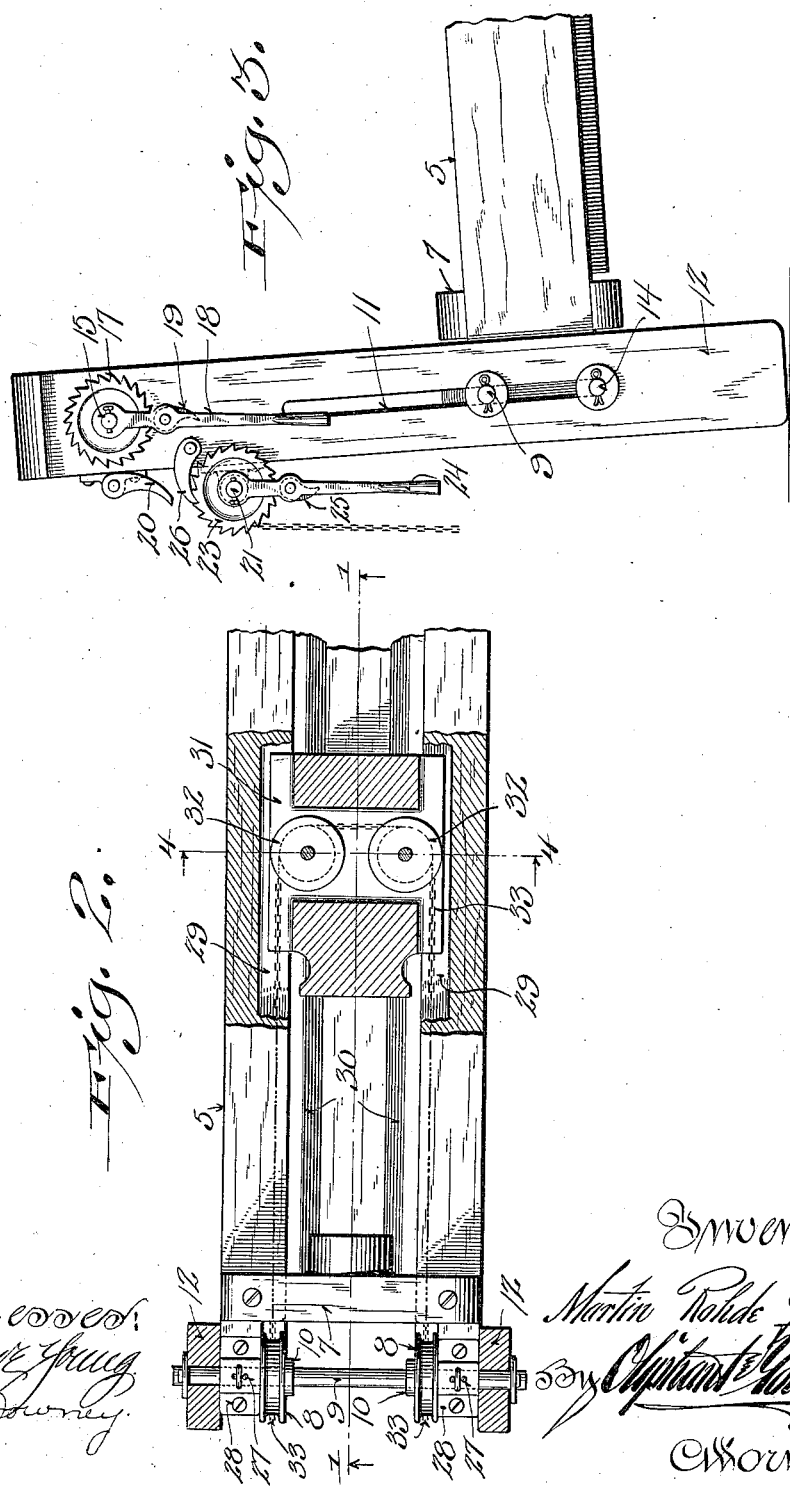

UNITED STATES PATENT OFFICE.

MARTIN ROHDE, JR., OF TIMOTHY, WISCONSIN.

CHEESE-PRESS.

1,045,190.  Specification of Letters Patent.  Patented Nov. 26, 1912.

Application filed July 31, 1912. Serial No. 712,383.

*To all whom it may concern:*

Be it known that I, MARTIN ROHDE, Jr., a citizen of the United States, and resident of Timothy, in the county of Manitowoc and State of Wisconsin, have invented certain new and useful Improvements in Cheese-Presses; and I do hereby declare that the following is a full, clear, and exact description thereof.

My invention consists in what is herein particularly set forth with reference to the accompanying drawings and pointed out in the claims of this specification, its object being to provide simple, economical and efficient presses for expressing whey from rows of hooped cheeses, particular reference being had to automatic action of the presses on the cheeses.

Figure 1 of the drawings represents a sectional view of a cheese-press in accordance with my invention and is indicated by line 1—1 in the next described figure of the series; Fig. 2, a plan view of a fragment of the press partly in horizontal section, this view being indicated by line 2—2 in Fig. 1; Fig. 3, a side elevation of a fragment of the press, and Fig. 4, a transverse section of the cheese-trough of said press and a follower therein.

Referring by numerals to the drawings, 5 indicates a cheese-trough of any suitable construction having rear legs 6 rigid therewith and suitably braced, whereby the rear end of said trough has fixed elevation. The side beams of the trough extend forward of the head-block 7 constituting part of said trough, and they are cut away to obtain clearance for a pair of sheaves 8 loose on an arbor 9 for which said beams are provided with seats. Sheave-guards 10 engage the arbor 9 and are rigidly secured to the side beams of the trough, and said arbor extends through vertical slots 11 in standards 12 connected by a head-piece 13 with which they form a frame.

The slots of the frame-standards 12 are engaged by a stop-rod 14 in the descending path of the trough 5 and arranged to turn in said standards is a shaft 15 having a pair of pulleys 16 fast thereon, each of the pulleys being over one of the sheaves aforesaid. Fast on the shaft 15, outside of one of the frame-standards, is a ratchet-wheel 17, and loose on said shaft is a lever 18 carrying a pivotal pawl 19 with which to engage the ratchet-wheel. The shaft 15, pulleys 16, ratchet-wheel 17, lever 18, and pawl 19, constitute a windlass, and a detent 20 for said ratchet-wheel is pivotally connected to the adjacent frame-standard.

The aforesaid frame-standards are provided with bearings for another shaft 21, and fast on this shaft is a pair of sprocket-wheels 22 and a ratchet-wheel 23. A lever 24 loose on the shaft 21 carries a pivotal pawl 25 engageable with the ratchet-wheel 23, and a detent 26 engageable with the ratchet-wheel 23 is pivotally connected to an adjacent frame-standard. The shaft 21, sprocket-wheels 22, ratchet-wheel 23, lever 24, and pawl 25 constitute a windlass independent of the one aforesaid. The pulleys 16 on the windlass-shaft 15 are connected by chains 27 to bearing-caps 28 fast to the side beams of the trough 5 over the arbor 9, and by operating said shaft said trough is lifted away from the stop-rod 14 as far as the slots in the frame-standards 12 will permit. Guided in side-beam grooves 29 and on cheese-supporting ribs 30 of the trough 5 is a partly hollow follower-block 31, in which a pair of sheaves 32 are arranged. Trained on the sprocket-wheels 22, sheaves 8 and 32, is a chain 33, and by manipulation of the windlass-shaft 21, the chain 33 is actuated to tighten the follower-block against hooped cheeses interposed between it and the head 7 of the aforesaid trough, as illustrated by dotted lines in Fig. 1.

In practice, the trough 5 is elevated and held in an approximately horizontal position by an engagement of the detent 20 with the ratchet-wheel 17, the chain 33 slackened on the sprocket-wheels 22 and the follower-block 31 drawn back to permit the interposition of hooped cheeses between it and the head-block 7, after which said follower-block is drawn against the cheeses, the slack of said chain, in this operation, being automatically taken up and held by said sprocket-wheels. The detent 20 is now disengaged from the ratchet-wheel 17 to permit an automatic gradual lowering of the forward end of the trough 5, the result being a further draw of the follower-block against the cheeses. The elevation of the trough, taking up of slack of the chain 33 and release of said trough to permit automatic descent of its forward end is repeated from time to time until the whey is thoroughly expressed from the cheeses.

Without departure from my invention as herein claimed, provision other than a windlass and detent, as above specified, may be employed for holding the chain 33 when the forward end of the cheese-trough is free to descend.

I claim:

1. A cheese-press comprising a trough having rear support at a fixed elevation, a frame in which the forward head-block end of the trough is vertically movable within predetermined limits, means for elevating and temporarily holding said forward end of the trough, a follower-block guided in said trough, and means for drawing the follower-block against cheeses interposed between it and the head-block, as well as for maintaining the pressure of said follower-block upon the cheeses when the aforesaid forward end of said trough is free to descend.

2. A cheese-press comprising a trough having rear support at a fixed elevation, a frame having vertically slotted standards, an arbor supported by the trough forward of its head-block and engaging the slots in the frame-standards, means in conjunction with the frame for limiting descent of the forward head-block end of said trough, means for elevating and temporarily holding said end of the trough, a follower-block guided in said trough, sheaves in the follower-block and on said arbor, a chain trained on the sheaves, and means for holding the chain when the aforesaid end of the trough is free to descend.

3. A cheese-press comprising a trough having rear support at a fixed elevation, a frame having vertically slotted standards, an arbor supported by the trough forward of its head-block and engaging the slots in the frame-standards, a stop-rod also engaging said slots in the path of the descending forward head-block end of said trough, means for elevating and temporarily holding said end of the trough, a follower-block guided in said trough, sheaves in the follower-block and on said arbor, a chain trained on the sheaves, and means for holding the chain when the aforesaid end of the trough is free to descend.

4. A cheese-press comprising a trough having rear support at a fixed elevation, a frame in which the forward head-block end of the trough is vertically movable within predetermined limits, a windlass with which the frame is provided, chains connecting said frame with pulleys of the windlass, a detent for said windlass, a follower-block guided in said trough, and means for drawing the follower-block against cheeses interposed between it and the head-block, as well as for maintaining the pressure of said follower-block upon the cheeses when the aforesaid forward end of said trough is free to descend.

5. A cheese-press comprising a trough having rear support at a fixed elevation, a frame in which the forward head-block end of the trough is vertically movable within predetermined limits, means for elevating and temporarily holding said forward end of the trough, sheaves carried by said trough at its forward end, a follower-block guided in said trough, sheaves in the follower-block, a chain trained on all the sheaves aforesaid, a frame-supported windlass having sprocket-wheels upon which the chain is caught, and a detent for the windlass.

In testimony that I claim the foregoing I have hereunto set may hand at Manitowoc city in the county of Manitowoc and State of Wisconsin in the presence of two witnesses.

MARTIN ROHDE, Jr.

Witnesses:
ANTON E. KERSCHER,
A. J. HESSEL.

---

Copies of this patent may be obtained for five cents each, by addressing the "Commissioner of Patents, Washington, D. C."